Oct. 12, 1943.  E. W. KELLOGG  2,331,478
METHOD OF AND APPARATUS FOR TESTING ARTICLES
Filed April 15, 1939  3 Sheets-Sheet 1
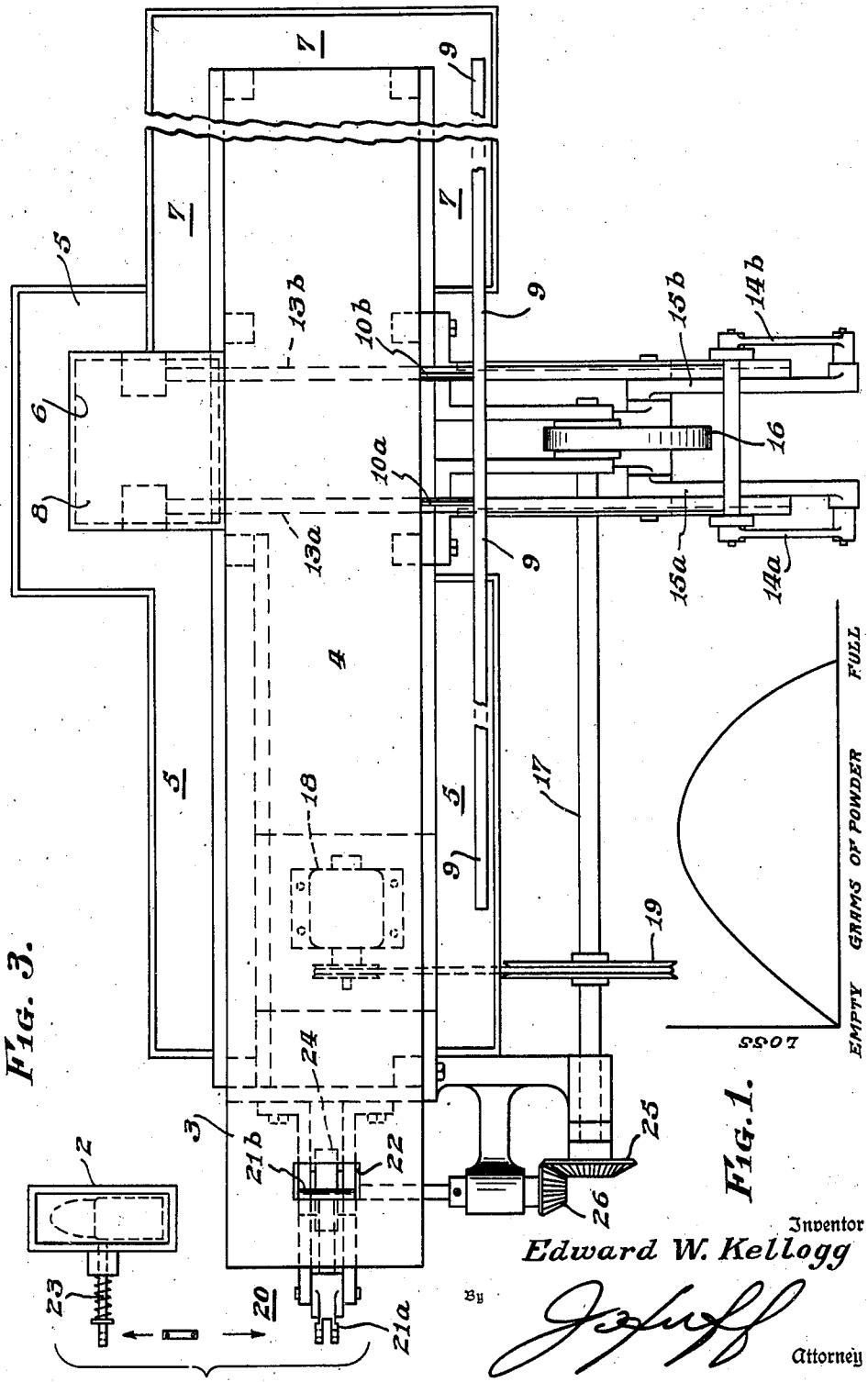
Inventor
Edward W. Kellogg
By
Attorney

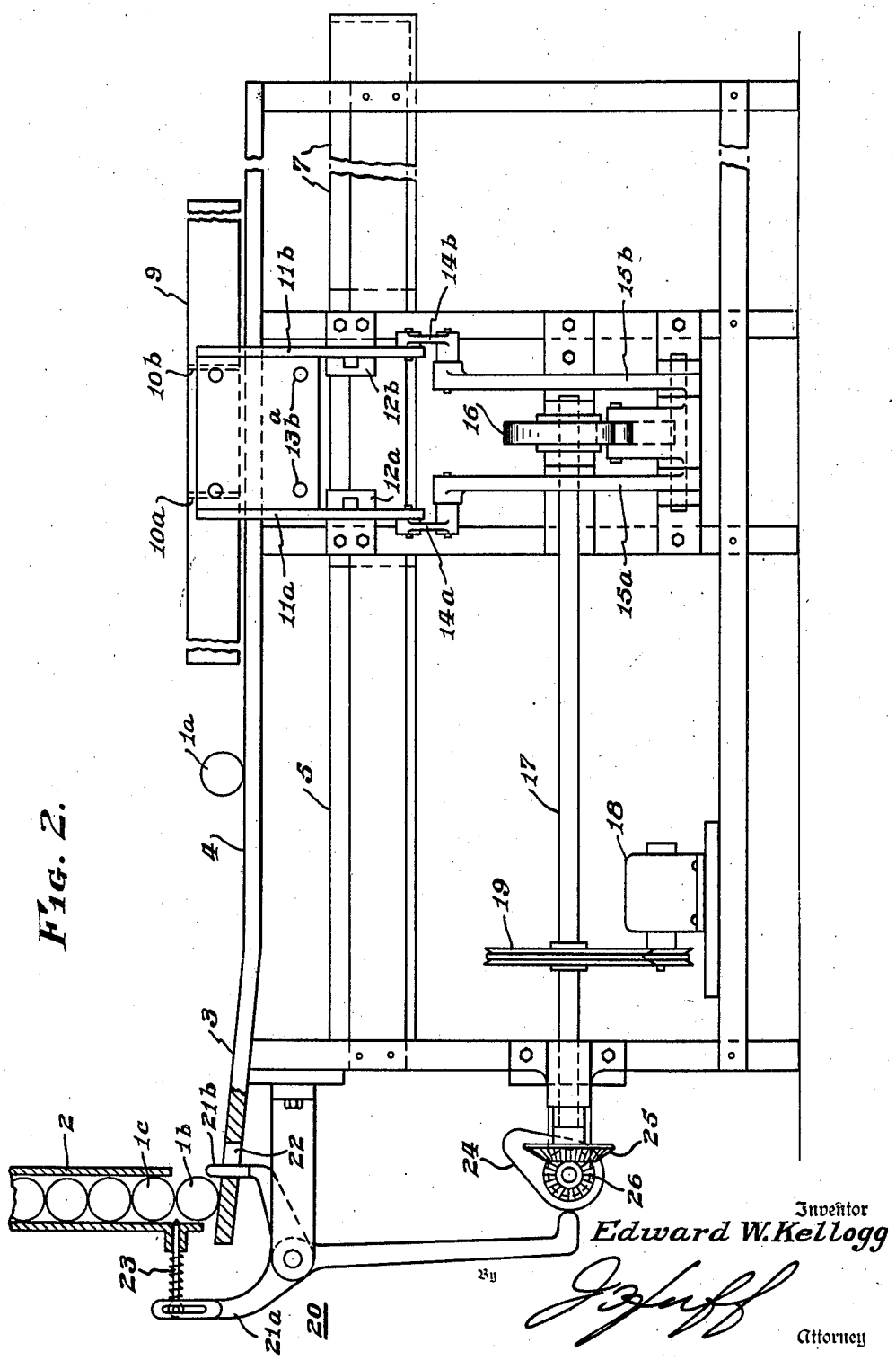

Oct. 12, 1943.     E. W. KELLOGG     2,331,478
METHOD OF AND APPARATUS FOR TESTING ARTICLES
Filed April 15, 1939     3 Sheets-Sheet 3
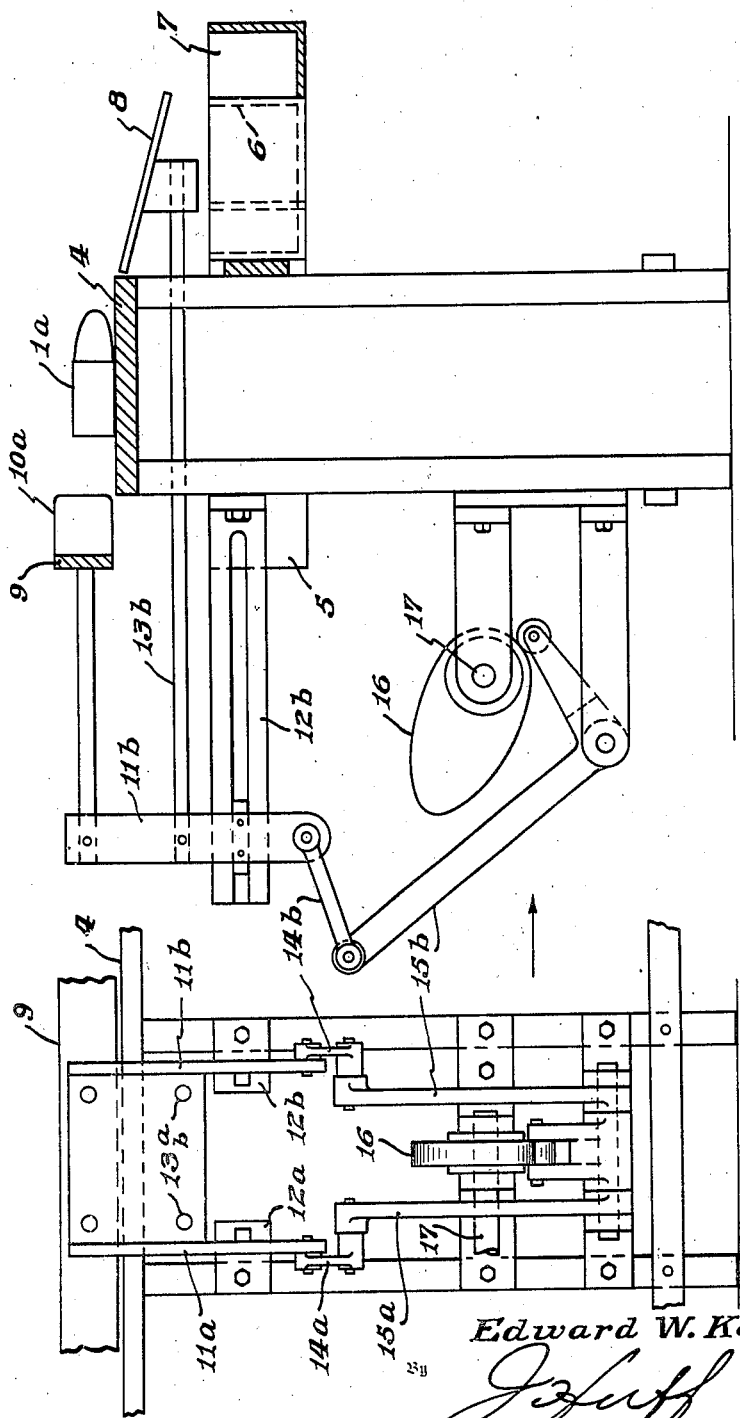
Inventor
Edward W. Kellogg
By
Attorney Patented Oct. 12, 1943

2,331,478

UNITED STATES PATENT OFFICE 2,331,478

METHOD OF AND APPARATUS FOR TESTING ARTICLES

Edward W. Kellogg, Moorestown, N. J., assignor to Radio Corporation of America, a corporation of Delaware Application April 15, 1939, Serial No. 267,987

12 Claims. (Cl. 209—112)

My present invention relates to methods of, and apparatus for, testing articles and has special reference to the testing of sealed fluid receptacles to determine the relative volumetric content of the fluid filler therein.

The word "fluid" as used herein is not limited to liquid and gaseous substances but includes other substances, such, for example, as powder, having particles which easily move and change their relative position and which are capable of flowing or being poured, and is intended to embrace any body of material which can change its form with moderate rapidity in response to gravity.

While my invention will be described as applied to the testing of cartridges for machine guns and other ordnance it is to be understood that the invention is not limited to such application as the disclosure in this respect is merely illustrative for purposes of explaining the inventive concept.

In many types of cartridge, the normal powder charge only partly fills the shell. The inadvertent use of an overcharged or an undercharged cartridge may result in serious damage to a gun and, indeed, to the gunner. An overcharged cartridge may cause a gun to explode by the very force of its discharge while in the case of an undercharged cartridge the priming may merely force the bullet into the gun barrel, effectively blocking it. In the latter case, the consequences are especially serious when the obstruction is not removed before the succeeding cartridge is fired.

Cartridge loading machines are usually provided with a mechanism designed to prevent a bullet from being inserted in an improperly charged cartridge; however, having regard for the serious consequences of the failure of such mechanisms it is desirable to subject the finished cartridges to test. Tests based upon weighing have proven to be of no avail since, usually, the normal charge of powder comprises only a very small fraction of the gross weight of the cartridge, and the normal tolerances in the weight of the metal parts exceed the weight of the powder. Experiments involving listening for sound when a cartridge is shaken have not proven satisfactory either because of human frailties in judgment or hearing, or because of the total absence of detectable sound, nor was there noticeable damping of an oscillating device designed to shake the powder from end to end.

Accordingly, the principal object of my invention is to provide a reliable and simple method of testing fluid receptacles to determine the relative volumetric content of the fluid filler therein, and in particular to distinguish between partly filled containers on the one hand, and completely filled or empty containers on the other hand.

Another object of my invention is to provide a simple, inexpensive and trouble-free apparatus for carrying the method of the invention into effect, and one which lends itself readily to the mass production of articles having substantially identical weight, size and external shape.

Other objects and advantages will be apparent and the invention itself will be best understood by reference to the following specification and to the accompanying drawings, wherein Figure 1 is a curve which will be referred to in explaining the principle of my invention, Figure 2 is a side elevation, partly in section, of a cartridge testing and sorting machine constructed in accordance with the principle of my invention, Figure 3 is a top plan view and Figure 4 is an end elevation of the apparatus of Fig. 2, and Figure 5 is an end elevation looking in the direction of the arrow in Fig. 4.

My invention is predicated upon an appreciation of the fact, and its application to testing purposes, that a receptacle containing "fluid" (in the broad sense already mentioned in this specification) experiences a dissipation of energy in response to rotation with respect to the direction of gravity, provided the angle of rotation exceeds that critical angle at which the body of fluid within the container changes its form. If the container contains a quantity of solid particles, there is no energy loss when the container is tipped or rotated unless the angle is sufficient to cause the particles to slide, or in other words, when the angle of the surface of the pile of particles exceeds the angle of repose for the material in question. Thus devices which impart a limited oscillatory movement to the container are ineffective for causing energy loss. It is therefore a feature of my invention that the container is subject to continuous rotation.

If the contents are very light in weight, or if on the other hand they are of the nature of a liquid of low viscosity, the energy loss in a single revolution is very small. I, therefore, subject the container, if necessary, to a rotation of many revolutions. In this case, the energy loss is cumulative, being directly proportional to the number of revolutions executed.

In accordance with the above principles, my invention consists in supplying to the receptacle under test a certain amount of energy, which energy is dissipated in the form of internal frictional losses during the continuous rotation, and furthermore in the feature that the rotation is continued long enough so that the cumulative effect of the small energy loss is sufficient to produce a readily measurable effect.

It is obvious that this energy loss may be employed to distinguish empty containers from those which are partly filled. It will also be seen on further thought that if the container is completely filled there will be no opportunity for the contents to change form and thereby dissipate energy. If a curve is plotted of energy loss per revolution versus degree of filling of the container, it will have the general form indicated by the curve of Fig. 1. Thus my testing method may not be capable of distinguishing between completely empty and completely filled containers, but it can be used to distinguish completely filled from partly filled containers. If it is desirable that the container be nearly but not completely full, my invention may be employed to separate containers with normal filling from those having too small a quantity of material and from those which are completely filled or entirely empty. Separation of normally filled from inadequately filled containers depends on quantitative determination of energy loss. Of course, there is the possibility of ambiguity if some containers have only a small quantity of fluid, but in normal manufacturing operations, the last mentioned condition is relatively rare.

In the case of cartridges, the correct filling is substantially such that it will produce maximum energy loss and the mechanism of charging operates in such a way that the failures to correctly charge a cartridge almost invariably result in giving it no powder at all, or else a double charge, which practically fills the shell. Thus the separation is clear-cut into correctly charged cartridges and rejects.

There are of course many possible methods of subjecting the cartridges or other containers to continuous rotation and determining the energy loss, but the simplest and therefore preferred method consists in rolling the containers along a substantially horizontal plane and allowing the distance rolled to serve as an index of relative energy loss. The entire plane may be given such a pitch that the correctly filled containers will refuse to roll, whereas the full or empty ones will roll the entire length of the plane. This, however, involves a critical adjustment. I therefore prefer to start the containers rolling with a definite and reproducible velocity and then permit them to roll as far as they can on a smooth horizontal surface. The distance they have rolled is then made the basis of sorting.

The starting impulse may be imparted by releasing the container at the upper end of a short incline, or alternatively, by a mechanical pusher. By the time the container has reached the bottom of the incline, it has received kinetic energy in an amount dependent on the height of the incline. It is this kinetic energy (which is partly rotary and partly translation) that is dissipated by the frictional losses incident to the flowing or tumbling of the fluid particles during rotation. As previously indicated, the amount of frictional losses each cylinder experiences during its rolling determines the "braking effect" thereon and hence the distance it rolls before coming to rest.

In Figs. 2 to 5, inclusive, 1a, 1b, 1c designate a number of cartridges or other cylindrical or round fluid receptacles to be tested, and 2 designates generally a magazine from which the cartridges are separately released in a manner later described.

The separately released cartridges are subject to a gravitational starting force or impulse and roll down an inclined surface 3 and, after numerous revolutions, come to rest upon a flat surface 4, which forms a continuation of the inclined surface 3. The distance each cartridge rolls on the flat surface 4 is a measure of the relative volumetric content of the fluid filler therein. As previously indicated, this is so because of the "braking action" which obtains due to the frictional losses created within the cartridges during the rolling by the change in the relative position of the particles of which the powder or other "fluid" is constituted.

Referring now particularly to Fig. 3, a number of boxes, compartments or bins 5, 6 and 7 surround the side edges of the surfaces upon which the cartridges roll. The bin 5 is positioned to receive any cartridges which, by reason of any eccentricity in movement or any accident fail to roll straight, or traverse a path other than that pursued by a perfectly round cylinder subject to the normal starting force and conditions of travel. The cartridges which find their way to this bin 5 are preferably subjected to retest.

The bin 7 is mounted along a side edge of the surface 4 remote from the starting point; it is positioned there to receive cartridges which by reason of minimum internal frictional losses roll farther than the ones which are subject to the frictional losses which obtain in a normally charged (i. e., partly filled) cartridge. The cartridges which find their way to bin 7 are later preferably discarded since the distance they have rolled to reach that bin is a positive indication that they are either overcharged or undercharged.

The length or span and position of the bin 6 are calculated (as by empirical tests with cartridges known to contain a normal charge) to embrace that portion of the surface 4 upon which the normally charged cartridges will cease rolling. Referring still to Fig. 3, the bin 6 is preferably provided with an outwardly inclined lid 8 which during the rolling interval is positioned over that bin so that if by reason of some eccentricity in its roll, a cartridge is projected over the edge of the surface 4, it will not fall into the bin 6 but will roll on the surface of the lid 8 and fall into the "retest bin" 5. If this precaution is not taken, it would be possible for a completely filled or an empty cartridge, which would normally roll beyond this section of the table, but which had failed to roll straight, to roll off the edge and fall into bin 6.

After a cartridge has had time to complete its roll and come to rest on the flat surface 4, a wiper arm 9 which is arranged to move in a straight line across the said surface pushes it into one or the other of the bins 5, 6 or 7 as determined by the position of the said cartridge with respect to the several bins. The wiper arm 9 is preferably provided with a pair of straight blades or fins 10a, 10b which extend outwardly therefrom in lines which coincide with the side walls which separate the bins, so that each cartridge will be directed to the bin in front of which it has come to rest and cannot be deflected into the wrong bin.

The wiper arm 9 is supported adjacent its ends by a pair of uprights 11a and 11b which are adapted to move on rails or tracks 12a and 12b in a direction to cause the arm 9 to wipe the surface 4. The uprights 11a, 11b carry rigid bars or rods 13a, 13b which extend beneath the surface 4 and comprise a support for the inclined lid 8 which covers the bin 6. It will be obvious from an inspection of Fig. 4 that as the uprights are moved on the tracks 12a, 12b to actuate the wiper arm 9, the lid 8 will be moved away from the surface 4 and the bin 6 will be uncovered.

The wiper arm 9 preferably extends along the entire length of the surface upon which the cartridges come to rest. Hence, upon movement of that arm across the surface 4, any cartridge in its path will necessarily be projected into one of the bins 5, 6 or 7. When the arm 9 returns to its idle position, as shown in Fig. 4, the table will be clear and another cartridge may be rolled along the surfaces 3, 4, without encountering any previously released cartridge.

The uprights 11a and 11b which comprise the carriage upon which the wiper arm 9 and lid supports 13a, 13b are mounted, have a driving force applied thereto through a pair of connecting links 14a and 14b which are pivotally mounted on bell cranks 15a, 15b, respectively. The bell cranks 15a, 15b are driven by a cam 16, which is fixedly mounted on a driving shaft 17. The shaft 17 in turn is driven by a motor 18 through a reduction drive 19.

The mechanism for releasing the cartridges is designed to operate after the above described clearing mechanism has completed its cycle of operation. As illustrated in the drawings, the cartridge releasing mechanism comprises an escapement indicated generally at 20 and having two pallet arms 21a and 21b thereon. The pallet arm 21a extends through a suitable orifice 22 on the surface 3 and, when it is in the raised position shown in Fig. 2, serves to hold a single cartridge 1b in position to be released on that surface. The other pallet arm 21a is provided with a pivoted plunger 23, the free end of which extends into the magazine 2 at a point immediately above the cartridge 1b. As the pallet arm 21b is depressed to release the cartridge 1b, the pallet arm 21a swings to the right (as viewed in Fig. 2) and the plunger 23 is urged inwardly beneath the cartridge 1c and prevents it and the other cartridges from dropping out of the magazine. When the pallet arm 21b is in its raised position the plunger 23 is moved outwardly to the position shown in Fig. 2, whereat the cartridge 1c drops onto the surface 3 and is held there until the arm 21b is again depressed.

The escapement 20 and hence the pallet arms 21a, 21b and the plunger 23 are actuated by a cam 24 which derives its driving force through gears 25 and 26 from the shaft 17 which controls the movement of the wiper arm 9 across the surface 4. The relative design and relative arrangement of the cams 24 and 16 is such as to ensure the desired clearing and releasing sequence.

I claim:

1. Method of testing fluid receptacles to determine the relative volumetric content of the fluid filler therein, said method comprising imparting to the containers substantially equal amounts of rotary kinetic energy, imparting a rolling movement to said containers permitting said rotary kinetic energy to be dissipated during said rolling movement in the form of internal frictional losses due to movement of the fluid within the containers, and then sorting said containers in accordance with the internal frictional losses each container experiences in dissipating said rotary kinetic energy and as manifest by the extent of said rolling movement.

2. Method of testing fluid receptacles to determine the relative volumetric content of the fluid filler therein, said method comprising imparting a rolling movement to each of said receptacles under the influence of a starting impulse of certain intensity, and then sorting said receptacles in accordance with the internal frictional losses each receptacle experiences during its said rolling movement and as manifest by the extent of said movement.

3. Method of testing fluid receptacles to determine the relative volumetric content of the fluid filler therein, said method comprising imparting a rolling movement to said receptacles under the influence of starting impulses of substantially equal intensity and calculated to cause said receptacles to undergo a rotation of numerous revolutions, and then sorting said receptacles in accordance with the accumulated energy loss each receptacle experiences during its said numerous revolutions and as manifest by the extent of its said rolling movement.

4. Method of testing fluid receptacles to determine the relative volumetric content of the fluid filler therein, said method comprising imparting free movement to said receptacles under the influence of a force of certain magnitude, permitting the energy of motion thus imparted to said receptacles to be dissipated, and then sorting said receptacles in accordance with the rate at which said energy is dissipated.

5. In the method of sorting fluid receptacles in accordance with the relative volumetric content of the fluid therein, the steps which comprise applying a force of equal magnitude to each of said receptacles to impart movement to said receptacles, and then dissipating the kinetic energy of said moving receptacles in the form of internal frictional losses, whereby to produce variations in the extent of said movement of said receptacles corresponding to the relative volumetric content of the fluid therein.

6. Method of testing fluid receptacles which comprises subjecting said receptacles to a rolling movement of predetermined velocity, and then sorting said receptacles in accordance with the relative accumulated energy loss experienced during said rolling movement due to the relative volumetric content of the fluid filler therein, and as manifest by the extent of said rolling movement.

7. Apparatus for determining the relative volumetric content of fluid containers, said apparatus comprising means for imparting to the containers substantially equal amounts of rotary kinetic energy, a surface upon which said receptacles roll under the influence of said rotary kinetic energy and whereon said energy is dissipated in the form of internal frictional losses due to movement of the fluid within said containers, and means for sorting said containers in accordance with the internal frictional losses each container experiences in dissipating the rotary kinetic energy imparted thereto by said first-mentioned means.

8. Apparatus for determining the relative volumetric content of fluid receptacles, said apparatus comprising means for imparting a starting force of substantially duplicate intensity to said receptacles to cause them to undergo a rolling movement, and means for sorting said receptacles in accordance with the internal frictional losses each receptacle experiences in the course of its said rolling movement.

9. Apparatus for determining the relative volumetric content of fluid receptacles, said apparatus comprising means for separately imparting to said receptacles a starting force of sufficient intensity to cause them to undergo a rotation of numerous revolutions, and means for sorting said receptacles in accordance with the rate of energy loss each receptacle experiences during its said numerous revolutions.

10. Apparatus for determining the relative volumetric content of fluid receptacles, said apparatus comprising a surface upon which said receptacles are adapted to be rolled, means for separately imparting to said receptacles starting impulses of sufficient intensity to cause them to undergo a rotation of numerous revolutions upon said surface, and means adapted to be moved over said surface upon completion of the movement of each receptacle for sorting them in accordance with the distance each receptacle has rolled.

11. Apparatus of the type described comprising an inclined surface, a flat surface forming a continuation of said inclined surface, a magazine for receptacles to be tested mounted adjacent said inclined surface, a plurality of bins for receiving the tested receptacles mounted along the edge of said flat surface, an escapement for releasing a receptacle from said magazine to cause it to roll down said inclined surface and thence onto said flat surface, a wiper arm mounted for movement across said flat surface whereby to project said receptacle into one of said bins as determined by the distance said receptacle rolls on said flat surface, means for actuating said wiper arm after an interval calculated to permit said receptacle to complete its roll, and means operable upon completion of the movement of said wiper arm for actuating said magazine escapement.

12. Method of testing fluid receptacles to determine the relative volumetric content of the fluid filler therein, said method comprising subjecting said receptacles to a force of a type and of an intensity calculated to cause said receptacles to undergo a rolling movement of numerous revolutions, and then sorting said receptacles in accordance with the internal frictional losses each receptacle experiences during its rotation and as manifest by the extent of said rolling movement.

EDWARD W. KELLOGG.